Patented May 4, 1937

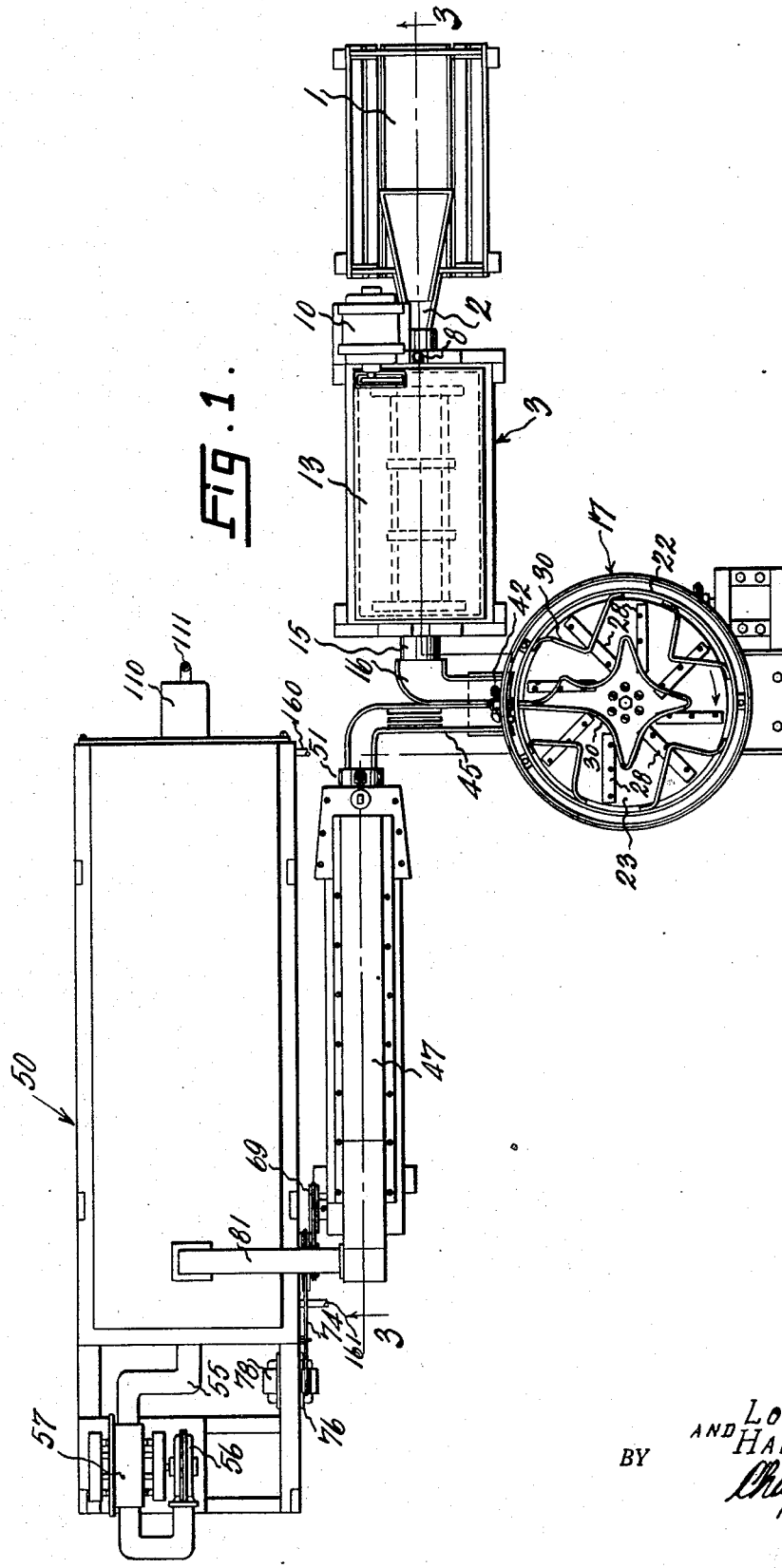

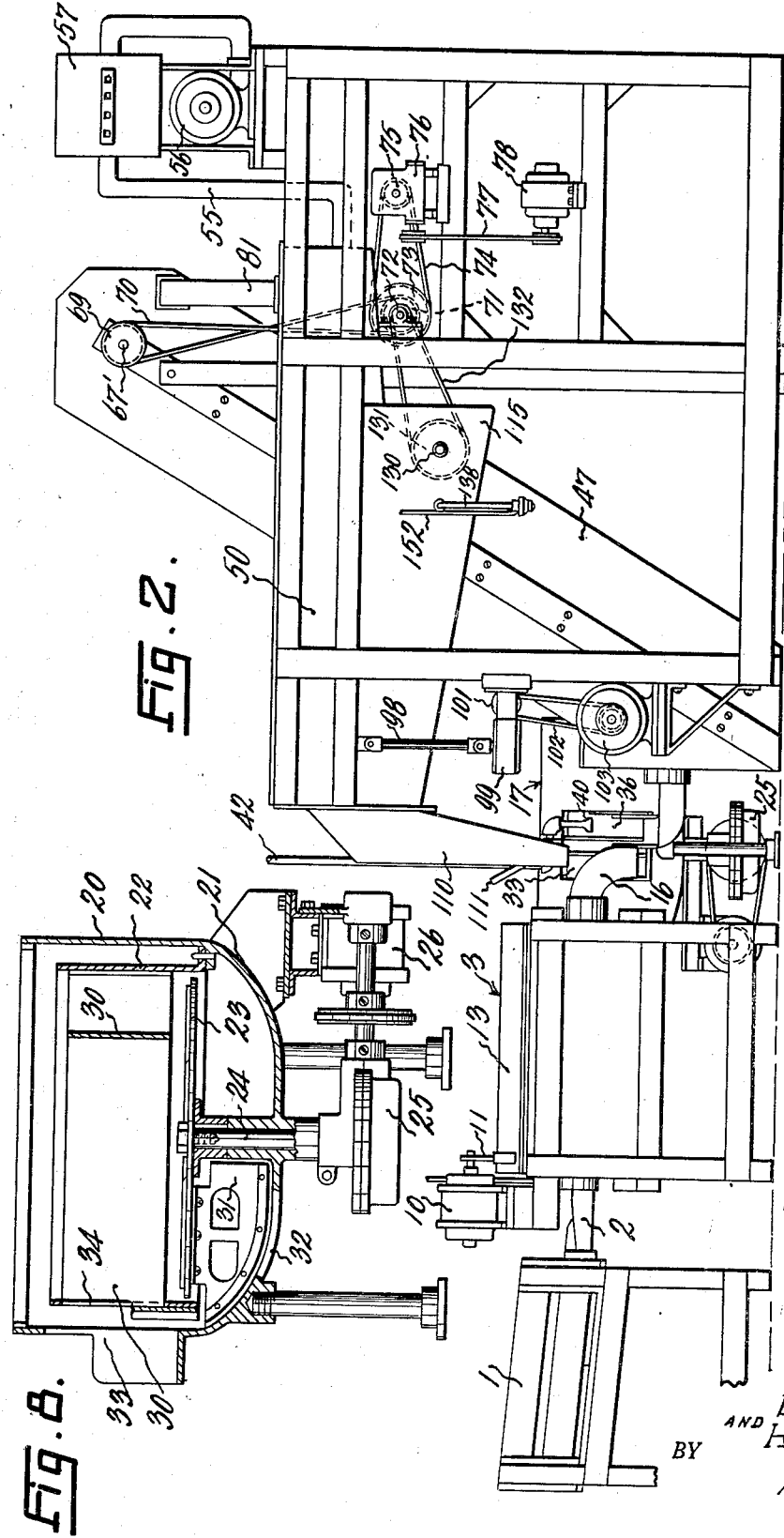

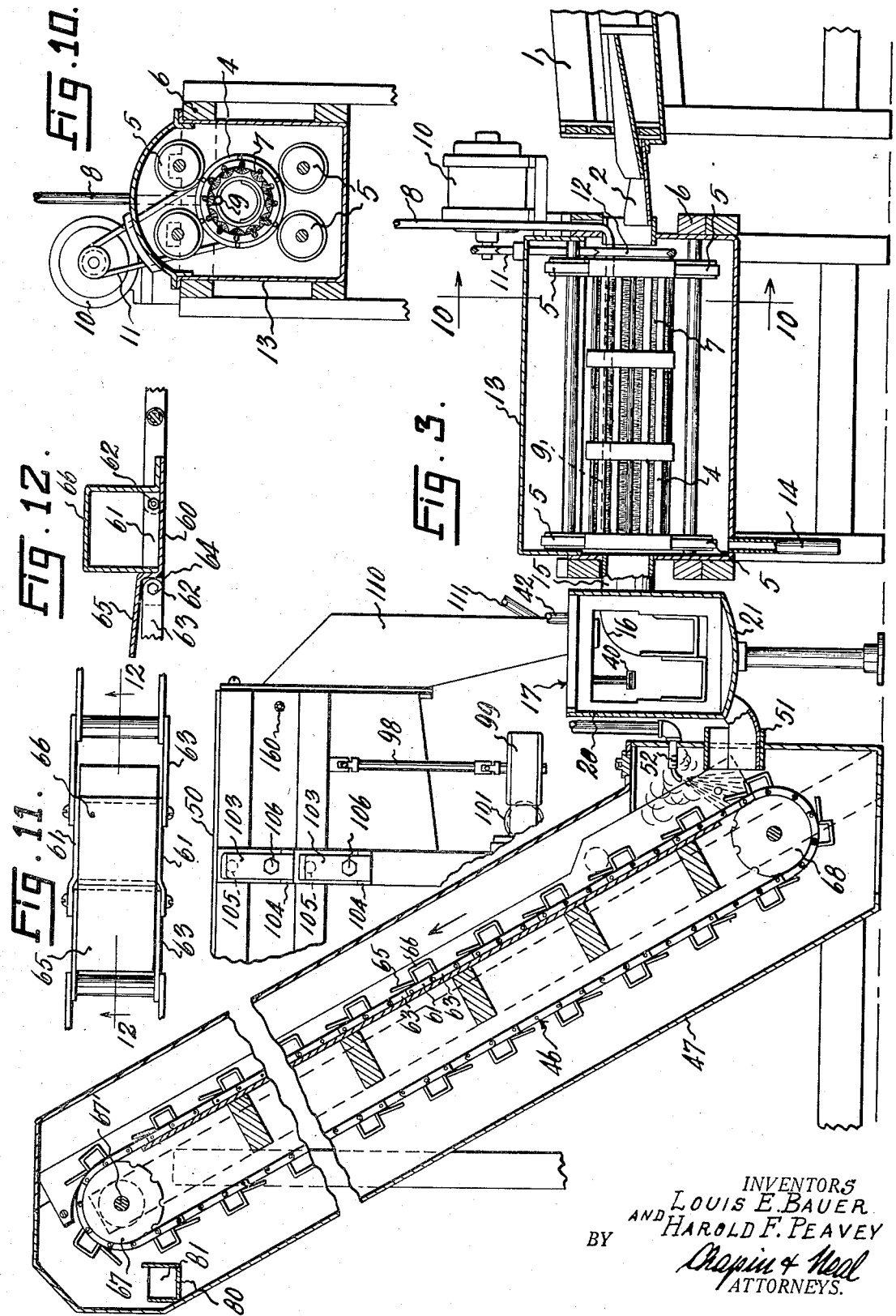

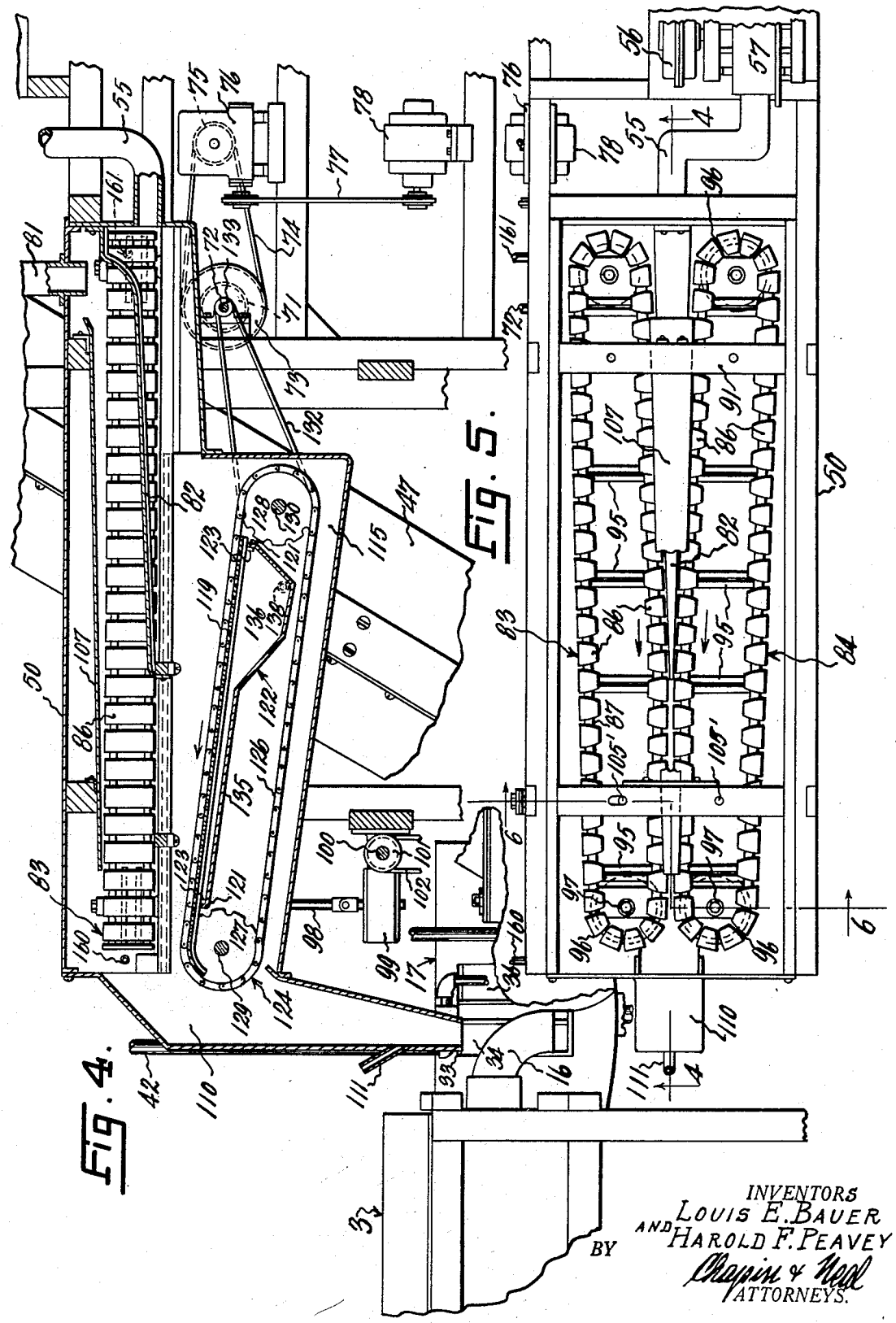

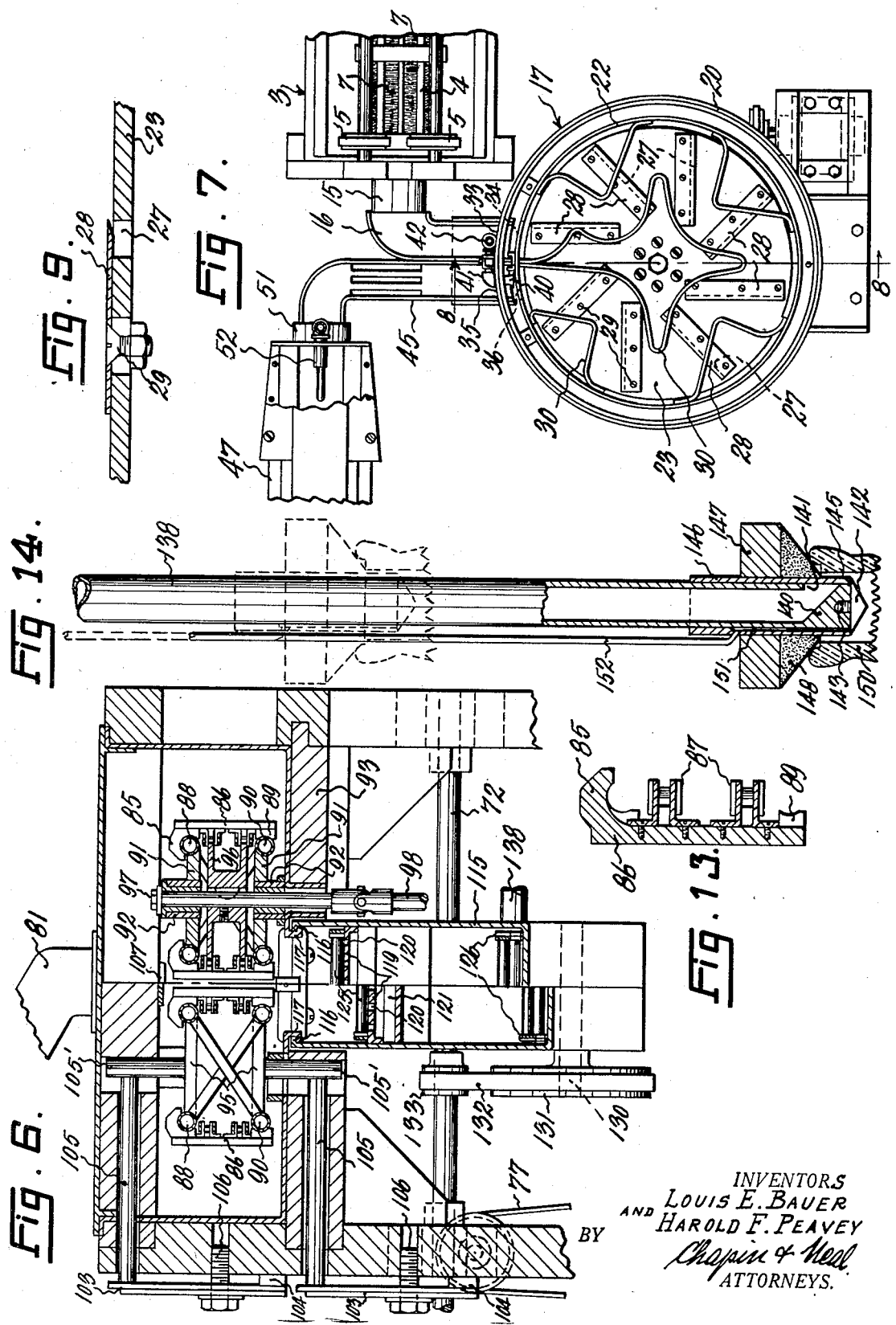

2,079,542

UNITED STATES PATENT OFFICE 2,079,542

METHOD AND APPARATUS FOR PREPARING FRUIT JUICES

Louis E. Bauer and Harold F. Peavey, Springfield, Mass., assignors to Citrus Products Equipment Company, a corporation of Massachusetts Application December 15, 1932, Serial No. 647,464

14 Claims. (Cl. 99—155)

This invention relates to the preparation of fruit juices, more particularly to the preparation of the juices of citrus fruits such as oranges.

This application is a continuation in part of applicants' copending application Serial No. 527,943, filed April 6, 1931.

Fruit juices are readily susceptible to the action of yeasts, bacteria and other micro-organisms which results in fermentation, decomposition, and other changes in the juices harmfully affecting their natural flavor and preventing the keeping of the juices in their natural condition for any length of time after extraction from the fruit. In order to distribute extracted fruit juices in bottled condition it has heretofore been found necessary to resort to sterilization or pasteurization of the juice or to subject it to violet ray treatment or to the addition of chemical preservatives in order to prevent or inhibit the action of yeasts and bacteria. All of these and similar preservative methods adversely affect the flavor of the juice and have militated against bottled juices in competition with the extraction of the juice in the home or other places of consumption where it can be immediately consumed. The relative high vitamin content of certain fruit juices, such as orange juice, has led to an increased consumption and demand for these juices. Oxidation, however, materially reduces the vitamin strength of the juice and the aeration incident to usual extraction methods with its resulting tendency to oxidation has been a further obstacle to the distribution of extracted juice. The preservative methods mentioned tend to materially reduce the vitamin content of the juices. Oxidation of the extracted juice also harmfully affects the flavor of the juice.

It is one of the objects of the present invention to provide a method of preparing fruit juice so that it may be bottled and commercially distributed without resort to preservative methods such as those mentioned, without impairment of its natural flavor and without substantial reduction of its vitamin content. As a result juice extracted and bottled according to our method is comparable to and can compete with the fresh home extracted juice.

A further object is to provide a machine for carrying out the method.

Other and more specific objects of the invention will be apparent from the following specification and claims.

In the method of our invention, as will later more fully appear, particular attention is given to the conditions under which the juice is extracted and the manner of its extraction to the end that the juice is bottled in its naturally sterile, uncontaminated condition and with a minimum oxidation of the juice.

In the accompanying drawings which illustrate one manner of carrying out the invention, Fig. 1 is a plan view of the apparatus;

Fig. 2 is a side view;

Fig. 3 is a section, on a larger scale taken substantially on line 3—3 of Fig. 1;

Fig. 4 is a section on a larger scale taken substantially on line 4—4 of Fig. 5;

Fig. 5 is a plan view of the extracting mechanism;

Fig. 6 is a section on a large scale taken substantially on line 6—6 of Fig. 5;

Fig. 7 is a plan view of the fruit chipping device and adjacent parts;

Fig. 8 is a sectional view substantially on line 8—8 of Fig. 7;

Fig. 9 is a sectional detail view of one of the chipping knives;

Fig. 10 is a section on a larger scale taken substantially on line 10—10 of Fig. 3;

Fig. 11 is a detail plan view of the fruit conveyor;

Fig. 12 is a section taken substantially on line 12—12 of Fig. 11;

Fig. 13 is a detail sectional view of one of the juice extracting elements; and

Fig. 14 is a detail view of the means for filling the containers.

The deterioration of natural orange juice flavor and food value takes place mainly from three causes.

1. By the action of micro-organisms, principally yeasts and molds; and various enzymes and bacteria.

2. By oxidation of the essential oils, esters, aldehydes and vitamins.

3. By the inclusion of alkaloids, glucosides and excess oil; these three originating in the rag, seeds or outer peel.

The juice, as enclosed by nature in sound fruit, is sterile. The first cause of deterioration mentioned is the result of contamination by micro-organisms, the second is the result of aeration and/or contamination with oxidizing enzymes and the third is the result of faulty mechanical manipulation in the extraction of the juice.

In carrying out our method of preparing bottled fruit juice, such as orange juice, we first kill, or remove from the surface of the fruit, all yeasts, molds and other micro-organisms which would, if given opportunity, harmfully affect the juice.

The instantaneous thermal death point of such micro-organisms as they are found on oranges or in the atmosphere is below 205° F., and a temperature of 175° F. will kill them in fifteen seconds or less, and our preferred manner of rendering the surface of the fruit free of contaminating micro-organisms is to subject the fruit to steam and hot water sprays, casual steam, and hot air sufficient to kill thermally the micro-organisms adhering to the surface without materially raising the temperature of the fruit as a whole. From this sterilizing treatment the sterile fruit enters a sterile enclosure. As will be later more fully explained this enclosure is sterilized before the fruit enters and is maintained sterile and filled with a sterile atmosphere. Within this sterile enclosure the juice is extracted from the fruit and the extracted juice is transferred from the enclosure to a sterile container under aseptic conditions with the result that the bottled juice is sterile and sterilization or pasteurization of the bottled juice, or the addition of "preservative" substances to the juice, is unnecessary to prevent spoilage of the juice, since by our method the causes of spoilage have been eliminated. This initial asepticizing or sterilization of the surface of the fruit and the maintaining of the resulting aseptic condition of the fruit throughout the extracting and bottling of the juice are fundamental and essential steps of our process.

It will be noted that insofar as oxidation is due to the action of enzymes the sterilizing operations above mentioned tend to reduce oxidation to the extent that the production of oxidizing enzymes is prevented or their action inhibited. To further reduce oxidation we preferably (1) treat the fruit, prior to extraction of the juice, to facilitate an easy flow of juice from the skins, (2) extract the juice by low squeezing pressure which prevents or minimizes "squirting" of the juice, (3) eliminate any substantial agitation of the juice with air inclusion as the juice flows through the machine and (4) fill the bottles from the bottom with very litle splash or agitation. These features are valuable parts of the process because oxidized juice, while not "spoiled", is inferior in flavor and has lost most of its original vitamin C potency. Orange juice extracted and bottled according to our method is remarkable in not losing over ten per cent of its original vitamin C potency within ten days after its extraction.

Excess oil and other constituents of the rind and rag in juice extracted according to our method is prevented by the treatment of the fruit prior to and during the extraction of the juice as will be explained in the following description of the apparatus.

Referring to Figs. 1, 2, and 3 of the drawings, I designates a hopper from which the fruit is fed through a chute 2 to a rotary scrubber generally indicated at 3. This scrubber comprises a cylindrical brush including a frame 4 rotatably mounted within guiding wheels 5 engaging the frame adjacent its ends. The wheels 5 are journalled in a suitable supporting framework 6 and are positioned to slightly incline the brush frame downwardly from chute 2. Within the cylindrical frame 4 and extending from end to end thereof are a plurality of brush members 7 with short stiff bristles projecting inwardly toward the axis of the cylinder. Water is conducted to the interior of the brush by means of a pipe 8 having a portion 9 extending lengthwise within the cylinder and pierced at intervals to deliver needle jets of hot water onto the fruit as the latter passes through the brush. The brush is driven from an electric motor 10 by a belt 11 which passes around an annular pulley 12 secured to the raised end of the brush frame. A suitable casing 13 encloses the rotating brush and a drain pipe 14 leading from the bottom of the casing carries off the waste wash water. The fruit is discharged from the scrubber through an axially positioned conduit 15 into a chute 16 which delivers it by gravity to a peeler or chipper generally indicated at 17.

The chipper 17 best shown in Figs. 7 and 8 comprises a generally cylindrical outer casing 20 having a tapered bottom portion 21. An inner stationary cylindrical member 22 is contained within casing 20, the bottom of member 22 being closed except at the edges by a horizontal rotary plate 23 secured to a vertical shaft 24 driven through suitable reduction gearing 25 from a motor 26. Plate 23 is provided with a plurality of slots 27, inclined slightly from the radial, over which chipping knives 28 (see Fig. 7) are secured as by screws 29. By adjusting the position of the knives relative to the slots the depth of chipping may be controlled as hereinafter described. A plurality of stationary deflectors 30 are supported by member 22 the lower edges of the deflectors being sufficiently close to the surface of plate 22 to prevent the fruit from passing under the deflectors but allowing the portions of the peel removed by the knives to pass to, and over, the outer edge of the plate for discharge to the tapered portion 21 of outer casing 20. A blade 31 secured to the under side of plate 23 sweeps the chippings collected in the bottom of casing 20 to a discharge opening 32.

A suitable opening 33 is provided in casing 20 for the passage of the fruit from chute 16 into the chipper and onto plate 23, and discharge openings 36 are provided for the discharge of the fruit therefrom. The rotation of plate 23 tends to throw the fruit outwardly, and deflectors 29 combine with this action to cause the fruit to travel with an irregular rotation in a zigzag path over the plate from the entrance to the exit, the knives making random cuts, which remove chips of the rind or outer peel, as the fruit travels over the plate.

Positioned at the exit from the chipper is a nozzle 40 which directs a jet of water against the outcoming fruit. The nozzle is pivoted at an elbow 41 in the pipe 42 which supplies the nozzle with water so that the direction of the jet can be raised or lowered. The water jet from nozzle 40 performs two functions. It washes from the surface of the fruit finely-divided matter, produced by the knives, which matter has a bitter taste and which if not removed collects within the machine as a scum and when carried into the product in varying quantities, produces a noticeable variation in flavor. Oil freed from the skin by the chipper tends to build up on the knives and rotor to a point where that rubbed off on to the fruit approximates that removed by the chipping. The jet of water not only removes such oil accumulations from the fruit, but, by keeping the rotor and knives bathed in water, prevents adhesion of the oil to the rotor and knives. The jet also tends to retard the discharge of the fruit from the chipper and the degree of retardation can be controlled by varying the angle of the jet and consequently the point at which the jet strikes the fruit. A similar effect may be obtained by varying the pressure of the jet, or a combination of the two.

Viewing the operation of the chipper as a whole it performs two functions. First, by removing portions of the peel it reduces the amount of the constituents of the peel which may find their way into the juice. The amount of such constituents permitted in the juice can thus be controlled by the extent of chipping, which can be regulated by setting the knives for large or small chips, varying the number of passes of the fruit in and out across the rotor plate as determined by the number of deflectors which pass the fruit across the plate against the centrifugal force resulting from the latter's rotation, by adjusting the angle of the deflectors, by adjusting the rinsing and retarding jet at the exit of the chipper, or by a combination of these means. The second function of the chipper resides in its preparation of the fruit for quiet, easy flowing extraction of the juice in a manner fully described hereafter.

From the chipper the fruit is discharged to an inclined chute 45 down which it rolls to the lower end of an elevator generally indicated at 46. The elevator 46 is enclosed in a housing or casing 47 forming part of an enclosure 50 in which the extracting and collecting of the juice takes place. The fruit enters the casing 47 through a short conduit 51 adjacent the inner opening of which is positioned a nozzle 52 having concentric passages through which hot water and steam are discharged, the steam being under sufficient pressure and of sufficient volume to assure an outward flow of air and vapor through all adjacent openings. The inclination of chute 45 and conduit 51 is such that the fruit rolls slowly through the curtain of steam and water from nozzle 52 onto the elevator (see Fig. 3). The surface of the fruit is thus sterilized, all adhering micro-organisms being killed, without substantially raising the temperature of the inside of the fruit. Air under pressure is forced into casing 50 through a pipe 55 by means of a blower 56 (see Figs. 1 and 2) the air in its travel from the blower to the casing passing through an electric heater 57 which raises it to a temperature of above 205° F. thus sterilizing it prior to its entrance to the casing. The pressure in the enclosure 50 created by the blower is sufficient to cause an outward flow of air through all casing openings and thus aseptic conditions are produced and maintained within the enclosure. It will thus be seen that the fruit is surface sterilized and passed into an aseptic enclosure.

The elevator 46 may be of any suitable construction; as shown it is formed of plates 60 having bent-up side members 61 connected at their ends by bolts 62 to intermediate links 63 to form an endless chain. The forward or advancing ends of the plates are bent upwardly as at 64 and forwardly at 65. Members 66 bent in the form of an inverted U are welded or otherwise secured to plates 60, and as indicated in dotted lines in Fig. 3 the fruit rests on portion 65 against members 66. The endless chain formed by the plates 60 and links 63 passes around upper and lower pulleys or sprockets 67 and 68 journalled in the casing 47, the shaft 67' of sprocket 67 being provided outside of casing 47 with a sprocket 69 driven by a sprocket chain 70 (see Fig. 2) from a sprocket 71 secured to a shaft 72. Shaft 72 is provided with a sprocket 73 connected by a chain 74 to a sprocket 75 secured to the shaft of a reduction gearing unit 76 driven through belt 77 from a motor 78. As the plates 60 of the elevator round the upper sprocket 67 the fruit is discharged, as shown in Fig. 3, into a trough 80 from which it rolls into a conduit 81 and is discharged by gravity onto a slightly inclined supporting plate 82 (Fig. 4) positioned between the juice extracting belts generally indicated at 83 and 84 and best shown in Figs. 4, 5, and 6. These belts are formed of a plurality of pressing members 86 formed of a suitable non-corrosive metal or of wood, connected to chains 87. The rear faces of member 86 are provided adjacent the upper ends of the members with hook-like shoes 85 riding on bars or tracks 88, the lower ends of the members 86 being provided with grooved blocks 89 riding against bars or tracks 90. It will thus be seen that the weight of the members 86 and the chains 87 is supported by tracks 88 and 90. The tracks 88 and 90 are supported adjacent their ends by cross-heads 91 (see Fig. 6) secured to bearings 92 supported in turn by cross members 93 of the frame of enclosure 50. A plurality of cross braces 95 positioned intermediate the ends of the tracks brace the tracks against distortion. The chains 87 pass around sprockets 96 secured to vertical shafts 97 journaled in the bearings 92.

The belts 83 and 84 are driven in the direction of the arrows in Fig. 5 from the shafts 97 at the discharge ends of the belts, which shafts are universally connected by shafts 98, through reduction gearings 99, to the ends of a horizontal shaft 100 provided intermediate its ends with a pulley 101 connected by belt 102 to a motor 103 (Fig. 2). The tracks 88, as best shown in Fig. 5, are spaced sufficiently apart at their receiving ends so that the fruit discharged onto support 82 are positioned between and are gripped and carried forward by the belts. The gradual converging of the tracks towards the discharge end causes the belts to exert a squeezing pressure on the fruit as it is carried forward, this pressure being cushioned (see Fig. 6) by leaf springs 103 each secured at one end to the supporting frame of the enclosure 50 as at 104 and having their free ends in engagement with rods 105 abutting against rods 105' secured to cross braces 95 adjacent the discharge end of the belt 83. The pressure exerted on the rods 105' by the springs 103 is made adjustable by bolts 106 in an obvious manner.

A guard 107 is positioned above the bite of the belts to assure proper engagement of the fruit by the belts and deflect upwardly discharged juice.

The extracting apparatus just described operates in conjunction with the chipper previously described to extract the juice with a minimum maceration of the rind and rag and minimum spurting and aeration of the juice. The chipping off of portions of the rind has provided zones of weakness around the fruit so that as the fruit is compressed between the belts the skin as a whole is collapsed without any "explosive" cracking or breaking, permitting a relatively easy flow of juice from the skins. Also since there is no relative movement between the fruit and the extracting means such as takes place when the juice is extracted by power reamers or by crushing rolls, the rind and rag is not subjected to maceration and the juice is removed from the skins without admixture of excessive amounts of the constituents of the rind and rag. The skins from which the juice has been extracted are discharged by the presser belts into a chute 110, extending from the housing 50 and removably secured in place by screws 111. The chute 110 discharges the skins into baskets or other receptacles, not shown. Steam is introduced into chute 110, adjacent the opening of the latter, as through pipe 111; the steam being under sufficient pressure and volume to assure against entrance of bacteria and yeasts into the casing through the open discharge end of the chute.

The means for collecting the extracted juice is best shown in Figs. 2, 4, and 6 and comprises a casing 115 positioned below the extracting means just described. The casing 115 forms part of the general enclosure 50 but for ease in cleaning it is made detachable therefrom. As shown the side walls of casing 115 are bent inwardly at their upper edges as at 116 (see Fig. 6) to form flanges engaging in grooves 117 formed at the edges of the opening in the enclosure 50 so that the casing 115 and its associated parts may be slid endwise from the enclosure 50, chute 110 having first been removed. The outer end of casing 115 communicates with chute 110 as will be clear from Fig. 4. A rearwardly inclined strainer in the form of a plate 119 provided with a plurality of holes 120 is positioned between the walls of casing 115 and rests upon the upwardly projecting ends 121 of a collecting tank 122 of relatively small capacity. Plate 119 is held against endwise movement by ears or lugs 123 engaging the ends of the tank. In order to prevent the openings in the strainer plate from becoming clogged by seeds and pulp a conveyor 124 formed by a plurality of bars 125 connected at their ends to spaced chains 126 is arranged to rest on and to travel over strainer plate 119, in the direction of the arrow in Fig. 4, the bars 125 operating to sweep the seeds and pulp from the strainer plate into chute 110. The conveyor 124 is supported by sprockets 127 and 128 mounted respectively on shafts 129 and 130 suitably journaled in the sides of casing 115. Shaft 130 is extended to receive a pulley 131 connected by a belt 132 to a pulley 133 secured on driven shaft 72.

The tank 122 is formed from a sheet or plate bent into the form shown in Fig. 4, the side edges of the plate being welded or otherwise secured to the sides of casing 115. The tank includes a drain portion 135 leading to the tank proper indicated at 136. It will be noted that the drain portion 135 is closely adjacent the strainer plate 119 and that the latter is positioned as close to the presser belts as structural factors permit so that the fall and splashing of the juice with consequent aeration is minimized.

The extracted juice collected in the tank proper 136 is drawn therefrom by gravity through a pipe 138 extending outwardly from the tank. The outer end of pipe 138 is bent downwardly and is provided with a filling head, best shown in Fig. 14. The lower end of pipe 138 is plugged as at 140 and is provided with a side opening 141 positioned slightly above the end of the pipe. A conical cap 142 is secured as by a threaded stem 143 to the plugged end of pipe 138, the cap 142 being of slightly greater diameter than the pipe to form an outwardly extending flange 145. Slidably mounted on pipe 138 is a sleeve 146 adapted when in its lowermost position, as shown in full lines in Fig. 14 to rest upon flange 145 and to close opening 141. Sleeve 146 carries an annular weighted collar 147 provided on its under side with a tapered sealing member 148, formed of rubber or the like, adapted to make a sealing engagement with the mouth of the container 150 to which the juice is to be transferred. Sleeve 146 is provided on its inner face with a groove 151, the lower end of which is closed by flange 145, the upper end communicating with a vent tube 152 which extends upwardly above the level of the juice within tank 136. Weighted collar 147 normally maintains sleeve 146 against flange 145 to seal both opening 141 and the lower end of groove 151. In operation the mouth of a sterilized container 150 is pressed against sealing member 148 as shown in full lines in Fig. 14 and raised to the dotted line position, until the point of cap 142 contacts with or is closely adjacent the bottom of the container, carrying with it sleeve 146 and opening groove 151 and side opening 141. Juice now flows into the bottom of the container, the wet steam left in the bottle from its sterilizing treatment being expelled through vent tube 152 as the juice rises in the container 150. The flow of juice continues until the juice fills the vent pipe to the level of the juice in tank 136. The container is now lowered, sleeve 146 following, and juice will continue to flow to fill the space occupied by the retreating pipe 138 until the opening 141 is closed by the sleeve. After the opening 141 is closed juice from vent tube 152 will continue to flow until groove 151 is closed by contact of the sleeve with flange 145 upon further retreat of the pipe 138. By properly proportioning the difference in level between the seat of the container against member 148 and the level of the sealing face of flange 145; the distance between the sealing face of flange 145 and the lower edge of the side opening 141; the displacement volume of the conical cap 142; and the time interval between the closing of the side opening 141 and groove 151; the ultimate level of the juice in the container 150 may be quite accurately controlled and made such that the container is substantially completely filled so that when capped, or otherwise closed, a minimum amount of air is left above the juice.

Before commencing operation we thoroughly sterilize the interior of the enclosure 50 and all mechanism contained therein by filling it with steam for a sufficient length of time. To facilitate this we provide, in addition to steam inlets 52 and 111, steam pipes 160 and 161 connecting directly to the body of the enclosure, see Figs. 1, 3, and 5. Having been sterilized, the aseptic condition of the enclosure is maintained by the pressure of sterile air maintained by blower 56 and the pressure of the steam supplied through inlets 52 and 111.

The complete operation may be summarized as follows; assuming the enclosure 50 to have been sterilized as above described and the various motors furnishing power to the moving parts to have been started and the various steam and water supplies to have been turned on. Fruit such as oranges, previously inspected for soundness, is fed continuously from hopper 1 to and through scrubber 3, where any surface dirt is removed. The fruit then passes to and through the chipper 17 where a controlled amount of the peel is removed in random chips to both control the amount of oil which will later enter the juice during extraction and to prepare the fruit for extraction of the juice without substantial resistance to the flow of juice from the skins. As the fruit leaves the chipper any adhering rind particles are washed off by the spray from nozzle 40, and the fruit then rolls down chute 45 into portion 47 of enclosure 50 and onto the elevator 46. As the fruit enters the enclosure 50 it is subjected to a bath of steam and hot water from nozzle 52 which sterilizes the surface of the fruit without substantially raising its temperature. Within the enclosure 50 the fruit is surrounded by an aseptic atmosphere of casual steam from the nozzle 52 and sterilized air from blower 56, and since such steam and air are supplied under sufficient pressure and in sufficient volume to maintain an outward flow of air through all openings in the enclosure, aseptic conditions within the enclosure are maintained.

From the elevator 46 the fruit is discharged between pressure belts 83 and 84. The low pressure gradually exerted by the belts, without permitting relative movement of the fruit with respect to the belts, squeezes the juice from the fruit without substantial resistance to the flow of the juice from the skins and without substantial maceration of the rind and rag. The extracted juice strained through plate 119 drains along member 135 into the tank 136 from which it is transferred under aseptic conditions as previously described into sterilized containers which are immediately closed. The bottling is carried on concurrently with the extraction, the capacity of tank 136 being only sufficient to assure continuous operation. The easy flow of the juice from the skins, its direct collection in the tank 136 and its direct bottling without permitting any large accumulation, together with the filling of the container or bottle from the bottom without undue splashing or agitation, and the substantially complete filling of the container minimizes the opportunity for oxidation of the juice.

It will be understood that various changes in the details of the apparatus, and in the mode of carrying out the invention, may be made without departing from the scope of the invention. For instance it is obvious that the chipping or other preparation of the fruit for quiet extraction of the juice might take place within the enclosure after the surface sterilization of the fruit instead of prior to such sterilization.

What we claim is:

1. The method of preparing fruit juices which comprises sterilizing the surface of the fruit, extracting the juice from the fruit without substantial resistance to the flow of juice from the skins, the fruit being maintained in its sterilized condition during its passage from the point of sterilization to the extracting means and throughout the extracting operation, so that the juice is obtained in its natural sterile and uncontaminated condition, transferring the resulting sterile but unsterilized juice under aseptic conditions to a sterilized container and immediately closing the container.

2. The method of preparing fruit juices which comprises sterilizing the surface of the fruit, extracting the juice from the fruit without undue maceration of the rind and rag, the fruit being maintained in its sterilized condition during its passage from the point of sterilization to the extracting means and throughout the extracting operation so that the juice is obtained in its natural sterile and uncontaminated condition, the fruit being treated prior to the extracting operation, to permit extraction of the juice without substantial resistance to the flow of the juice from the skins, transferring the resulting sterile but unsterilized juice to a sterilized container and immediately closing the container.

3. The method of preparing fruit juices which comprises sterilizing the surface of the fruit, extracting the juice from the fruit solely by compression, there being no relative movement between the parts of the fruit other than that obtained by the compressing action, the fruit being maintained in its sterilized condition during its passage from the point of sterilizaton to the extractng means and throughout the extracting operation so that the juice is obtained in its natural sterile and uncontaminated condition, transferring the resulting sterile but unsterilized juice under aseptic conditions to a sterilized container and immediately closing the container.

4. The method of preparing fruit juices which comprises passing the fruit through a surface sterilizing medium into an aseptic enclosure, extracting the juice from the fruit in such enclosure so that the juice is obtained in its natural sterile and uncontaminated condition, transferring the resulting sterile but unsterilized juice under aseptic conditions from the enclosure to a sterilized container and immediately closing the container.

5. The method of preparing fruit juices which comprises passing the fruit through a surface sterilizing medium into an aseptic enclosure, extracting the juice from the fruit in such enclosure solely by compression, there being no relative movement between the parts of the fruit other than that obtained by the compressing action so that the juice is obtained in its natural sterile and uncontaminated condition and substantially free from constituents of the rind and rag, transferring the resulting sterile but unsterilized juice under aseptic conditions to a container and immediately closing the container.

6. The method of preparing fruit juices which comprises washing and scrubbing the fruit, passing the clean fruit through a surface sterilizing spray of hot water into an aseptic enclosure, extracting the juice from the fruit in such enclosure solely by compression, there being no relative movement between the parts of the fruit other than that resulting from the compressive action so that the juice is obtained in its natural sterile and uncontaminated condition and substantially free from constituents of the rind and rag, the fruit being treated prior to the extracting operation to permit extraction of the juice without substantial resistance to the flow of the juice from the skins, transferring the sterile but unsterilized juice under aseptic conditions from the enclosure to a sterilized container with a minimum of agitation of the juice, and immediately closing the container.

7. The method of preparing fruit juices which comprises removing portions of the rind and the immediately adjacent underlying part of the skin to eliminate a portion of the oil content of the fruit and to decrease the resistance of the skin to collapse, sterilizing the surface of the so treated fruit and thereafter maintaining its sterile condition by surrounding it with a sterile atmosphere, extracting the juice from the fruit in such atmosphere solely by compression applied substantially diametrically of the fruit, transferring the extracted juice under aseptic conditions to a sterilized container and immediately closing the container.

8. Mechanism for preparing fruit juices which comprises a housing, means within the housing for extracting the juice from the fruit, said housing being provided with an opening through which the fruit may pass to the extracting means, sterilizing means positioned in said opening adapted to sterilize the surface of the fruit as it enters the housing and means to conduct sterile air into the housing under sufficient pressure to maintain an outward flow of air through all otherwise unguarded openings in the housing.

9. Mechanism for preparing fruit juices which comprises a housing, means within the housing for extracting the juice from the fruit, and collecting the extracted juice, said housing being provided with an opening through which the fruit may pass to the extracting means, sterilizing means positioned in said opening and adapted to sterilize the surface of the fruit as it enters the housing, means to conduct sterile air into the housing under sufficient pressure to maintain an outward flow of air through all otherwise unguarded openings in the housing and means to conduct the collected juice to the outside of the housing.

10. Mechanism for preparing fruit juices which comprises in combination, means for sterilizing the surface of the fruit, means for extracting the juice from the fruit and means to maintain the fruit in its sterilized condition during its passage from the sterilizing means to the extracting means and throughout the extracting operation.

11. Mechanism for preparing fruit juices which comprises in combination, means for spraying the fruit with water at sterilizing temperature, means for extracting the juice from the fruit without undue maceration of the rind and rag, means to maintain the fruit in its sterilized condition during its passage from the spraying means to the extracting means and means operable on the fruit prior to the extraction of the juice therefrom, to condition the fruit for extraction of the juice without substantial resistance to the flow of the juice from the skins.

12. Mechanism for preparing fruit juices which comprises a housing, means within the housing for extracting the juice from the fruit solely by compression without relative movement between the parts of the fruit other than that resulting from the compressing action so that the extracted juice is substantially free from constituents of the rind and rag, said housing being provided with an opening through which the fruit may pass to the extracting means, sterilizing means positioned in said opening and adapted to sterilize the surface of the fruit as it enters the housing, means to conduct sterile air into the housing under sufficient pressure to maintain an outward flow of air through all otherwise unguarded openings in the housing, means in the housing to collect the juice, means operative on the fruit prior to the extraction of the juice therefrom to condition the fruit for extraction of the juice without substantial resistance of the flow of the juice from the skins and means to conduct the collected juice to the exterior of the housing and into a container under aseptic conditions.

13. Mechanism for preparing fruit juices which comprises a housing, pressing means within the housing including a pair of horizontally positioned presser belts travelling around vertical axes and defining between them a channel of decreasing width, means to introduce the fruit between the belts at the wide end of the channel in position to be gripped between the belts, means to drive the belts in a direction to advance the fruit through said channel, the spacing of said belts being such that they exert gradually increasing pressure on the fruit to cause collapse of the skins and extraction of the juice therefrom, means to sterilize the surface of the fruit upon its entrance into the housing, means to maintain a sterile atmosphere within the housing, means operative upon the fruit prior to the entrance of the fruit between the presser belts to chip away random areas of the rind and immediately adjacent underlying portion of the skin to facilitate the collapse of the skins between the presser belts and minimize the resistance of the skins to the flow of the juice therefrom and means to collect the juice and to transfer it under aseptic conditions to containers positioned outside of the housing.

14. Mechanism for preparing fruit juices which comprises in combination a horizontally positioned rotating plate having a plurality of horizontally positioned chipping knives secured to its upper surface, means to feed the fruit in sequence on to the surface of said plate, deflecting means positioned above said plate to cause the fruit to travel in a tortuous path over the plate in operative contact with the knives whereby the latter remove random areas of the rind and immediately adjacent underlying portion of the skin, an adjustable nozzle positioned to direct a jet of water against the fruit to retard their discharge from the plate and simultaneously cleanse the fruit, means operative to apply pressure substantially diametrically of the fruit, said pressure being only sufficient to cause collapse of the previously weakened skin and extraction of the juice without substantial resistance to the flow of the juice therefrom, means positioned in the path of travel of the fruit from said plate to the extracting means, to sterilize the surface of the fruit, means to maintain the sterile condition of the fruit while passing from the sterilizing means to the juice extracting means and during the extracting operation.

LOUIS E. BAUER.
HAROLD F. PEAVEY.